United States Patent [19]

Devlin

[11] Patent Number: 5,126,536
[45] Date of Patent: Jun. 30, 1992

[54] CONTROL ARRANGEMENT FOR FOOD HEATING DEVICE

[75] Inventor: John C. Devlin, Melbourne, Australia

[73] Assignee: Black & Decker Inc., Newark, Del.

[21] Appl. No.: 455,409

[22] PCT Filed: Jul. 29, 1988

[86] PCT No.: PCT/AU88/00275

§ 371 Date: Dec. 28, 1989

§ 102(e) Date: Dec. 28, 1989

[87] PCT Pub. No.: WO89/01279

PCT Pub. Date: Feb. 9, 1989

[30] Foreign Application Priority Data

Jul. 29, 1987 [AU] Australia ................ PI3418

[51] Int. Cl.⁵ ............................................. H05B 1/02
[52] U.S. Cl. ................................. 219/497; 219/502;
219/518; 219/508; 99/333; 99/329 P
[58] Field of Search .............. 219/494, 492, 497, 501,
219/506, 507, 508, 518, 519, 502.1; 99/327, 332,
328, 399 P, 333, 329 R

[56] References Cited

U.S. PATENT DOCUMENTS

| | | | |
|---|---|---|---|
| 3,956,978 | 5/1976 | Borley | 219/502 |
| 4,083,054 | 4/1978 | Moraw et al. | 219/497 |
| 4,245,148 | 1/1981 | Gisske et al. | 219/519 |
| 4,345,145 | 8/1982 | Norwood | 219/492 |
| 4,363,957 | 12/1982 | Tachikawa et al. | 219/502 |
| 4,433,232 | 2/1984 | Tachikawa et al. | 219/502 |
| 4,510,376 | 4/1985 | Schneider | 219/518 |
| 4,755,656 | 7/1988 | Charlesworth et al. | 219/518 |

Primary Examiner—Mark H. Paschall
Attorney, Agent, or Firm—J. Bruce Hoofnagle

[57] ABSTRACT

A control arrangement for an electric food heating device having heating elements for heating foodstuff and providing a source of light impinging on the foodstuff, the control arrangement comprising: a peaking circuit (42, 30) to determine maximum reflected light from the foodstuff and provide a first signal (VI), and measuring subsequently reflected light from the foodstuff and providing a second signal (V2), said peacking circuit including amplifier means (30) for determining the difference between the first and the second signals, and providing a third signal (V3); and a comparator means (26) for comparing the third signal (V3) and a preset signal (VB), the preset signal being proportionate to a desired heating level, the comparator means providing a terminating signal (DONE) to deactivate heating when the preset and the third signals are substantially equal.

34 Claims, 6 Drawing Sheets

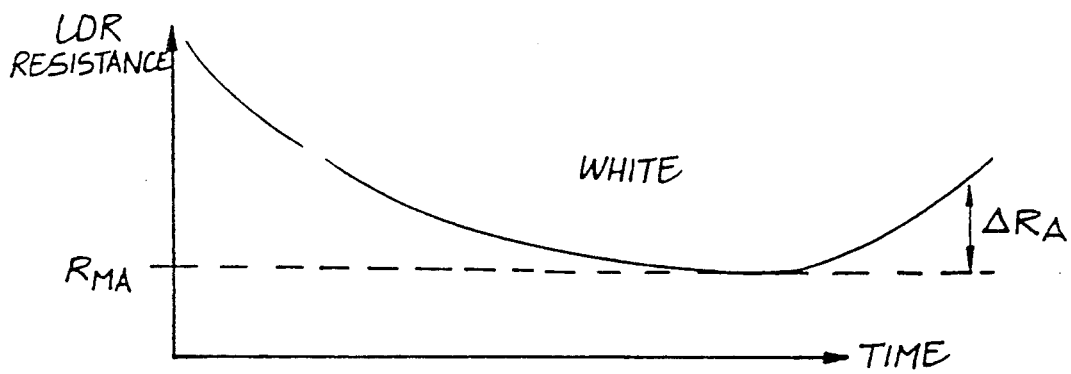
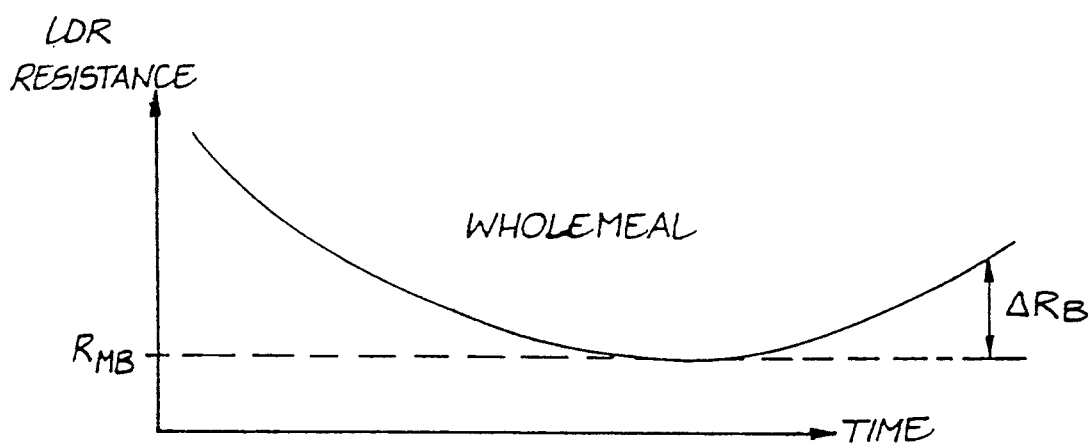
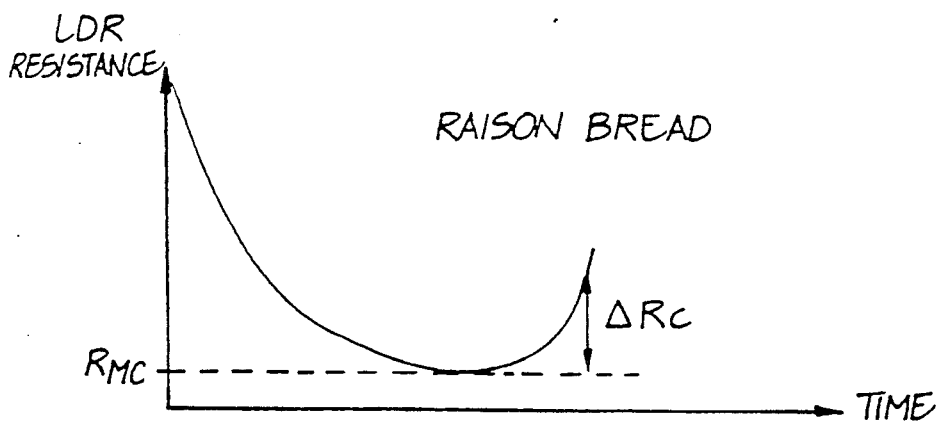
FOR THE SAME BROWNESS: $\dfrac{\Delta R_A}{R_{MA}} = \dfrac{\Delta R_B}{R_{MB}} = \dfrac{\Delta R_C}{R_{MC}}$
FIG. 5

FIG. 6
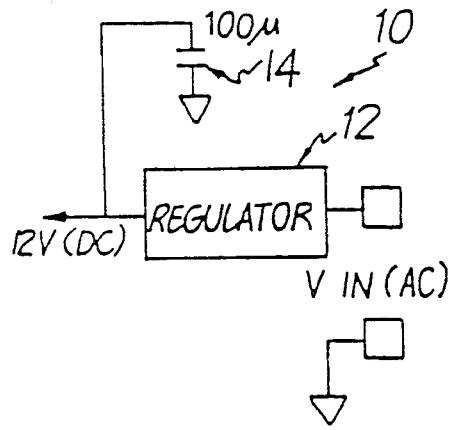
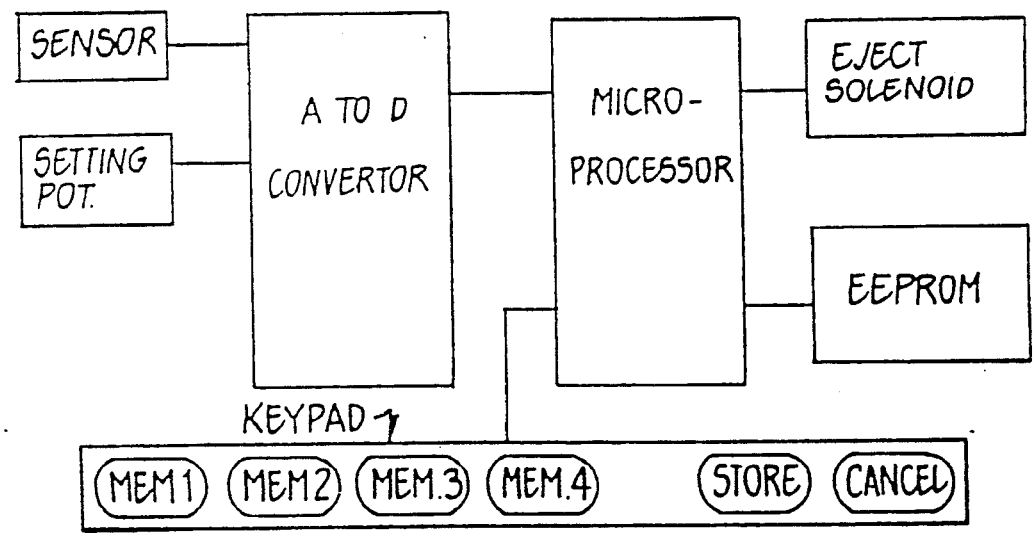
FIG. 7

CONTROL ARRANGEMENT FOR FOOD HEATING DEVICE

FIELD OF THE INVENTION

The present invention relates to electric toasters and associated control means. In particular, the present invention relates to providing apparatus for controling, regulating and/or sensing the extent of toasting.

BACKGROUND OF THE INVENTION

Various food products each require a varying degree of toasting in order to effect a desired "browness". For example, bread, muffins, crumpets and other food products each exhibit a varying degree of inherent untoasted browness, which inherent browness often results in excessive or inadequate toasting of the food product.

Conventional toasters perform adequately when set with respect to white bread but may over-toast brown bread and toasters which perform adequately when set with respect to brown bread may under-toast white bread. Compensation for the above may be effected by adjusting the toaster. This is often not precise and is often otherwise inconvenient or easily forgotton.

Furthermore, few toasters additionally incorporate a "warmup" feature, independent of a toasting function. Also, should the toaster be activated, without any food product therein, often hazardous toaster operation occurs, as a result of excessive heat.

U.S. Pat. No. 2,436,575 discloses a toaster which uses light emanating from a light source and reflected from toast, and measured either continuously or discontinuously, to produce a controlling current, which current operates a series of relays. When the current achieves a predetermined magnitude, the activated relays terminate the toasting operation. The specification also discloses a momentary delay operation to allow the photoelectric cell time to attain equilibrium when first measuring untoasted bread. U.S. Pat. No. 2,436,575 does not disclose a toaster wherein compensation for browness is effected dependent on the food product to be toasted.

U.S. Pat. No. 3,956,978 discloses a switching mechanism for a toaster to terminate supply of electricity to the toasting elements. This specification also discloses an alternative circuit which measures toast browness via light reflected from a separate light source in the toaster and also discloses a differential amplifier which triggers the termination of toasting when a desired browness is reached. However, the disclosed arrangement does not establish a signal which is needed to compensate for different bread types.

U.S. Pat. No. 4,363,957 discloses apparatus adapted to cook or char varied foodstuffs wherein the degree of charring is varied for each foodstuff. The control circuit described appears to generally disclose a circuit which stores a voltage representative of the maximum voltage provided by the optical sensor, that is minimum resistance of the sensor or maximum reflectively of the article, and uses this as a comparison datum in a comparator to compare changes or decreases in voltage as the article chars, to turn the power off at a certain changed level. U.S. Pat. No. 4,363,957 does not disclose the general concept of using a peak holding circuit to establish a reference representative of the maximum reflected light from the untoasted bread, measuring subsequent reflected light for the bread as it is being browned, comparing these results with a preset voltage representative of desired browning and terminating the toasting cycle when reaching the preset voltage in a toaster. The disclosure relies on a light source other than the toaster elements. The disclosure further does not teach a toaster having a timed warmup system, independent of the light sensor technique and also does not disclose a failsafe mechanism.

U.S. Pat. No. 4,426,572 relates to an improvement to U.S. Pat. No. 4,363,957. This disclosure deals with apparatus which more accurately measures light reflected from foodstuff being toasted. U.S. Pat. No. 4,433,232 relates to a further improvement to U.S. Pat. No. 4,363,957 and U.S. Pat. No. 4,426,572. This disclosure deals with the problem of accurately measuring the browness of foodstuff being browned, by avoiding the problem of light reflecting from the surface of the foodstuff.

U.S. Pat. No. 4,245,148 relates to a food browning device. The food browness is measured and dependent on surface colour. However, the specification does not disclose an apparatus which compensates its browness measurement according to the different types of foods being browned.

AU 66679/81 discloses a toaster which includes two light detectors, one arranged to monitor light emitted from a light source, the other arranged to monitor light reflected from an item being cooked. AU66679/81 does not disclose a toaster incorporating a warm-up feasture, nor a toaster which includes a failsafe feature. AU66679/81 does not disclose that the desired browness of various toasted foodstuffs is substantially equal when comparing the change in light reflected to a maximum amount of reflected light. The present invention is arranged to effect this.

DE 2,125,423 discloses a toaster which utilizes reflected light to measure the degree of brownness of toast irrespective of the type of bread being toasted or the moisture content thereof. With reference to FIG. 1, toast 3 is heated by electric element 1. Lights 5 and 51 reflect light from the toast to photocells 6 and 7. A mirror 15 is used to concentrate more radiant heat in area 19 on the toast than area 18. The desired degree of browness is measured by electronics 16 by comparing the brownness of areas 18 and 19. DE 2,125,423 does not disclose obtaining a maximum signal after which browness is measured, nor a warm-up feature.

DE 2,152,927 discloses a toaster which also utilizes reflected light to measure the degree of brownness of toast. However, it does not provide compensation for browning different types of bread, and accordingly, no maximum signal is derived after which brownness is measured. Furthermore, no warm-up feature or failsafe feature is disclosed.

JP,A, 57-198928 discloses a roaster wherein, with reference to FIG. 1, when toasting commences, capacitor 19 charges to level corresponding to a standard or the toast's initial reflectivity. After this switch 17 is switched over to begin browning of the bread, until the toast browness equals the value set on variable resistor 21. This specification does not provide a third signal, nor is there a disclosure as to what effects changeover of switch 17 to terminal "c", so that the toaster obtains a browness difference signal from the maximum value on capacitor 19. The present invention does not use a separate light source to irradiate the bread in the roaster, but uses the toasting elements to both radiated heat and enlighten the bread. The present invention also constantly senses the bread for a maximum light reflectivity, and so a more accurate assessment is made and a more consistent degree of browning is achieved between different types of toasted bread.

The present invention also uses one amplifier to initiate a maximum or peaking signal and provides or measures a difference signal. Use of one amplifier alleviates compensation and errors occurring as a result of more than one amplifier being used to measure and determine toast brownness.

OBJECTS OF INVENTION

An object of the present invention is to alleviate the disadvantages of the prior art.

A further object of the present invention is to provide a toaster adapted to compensate toasting browness generally in accordance with to the particular foodstuff being toasted.

A still further object of the present invention is to provide a timed warmup function independant of the compensated toaster and/or a timed failsafe mechanism to deactivate the toaster after a prescribed time.

SUMMARY OF THE INVENTION

The present invention may provide a control arrangement or an electric food heating device having heating elements for heating foodstuff and said heating elements providing a source of light impinging on the foodstuff, the control arrangement comprising:

a peaking circuit to determine maximum reflected light from the foodstuff and provide a first signal, and measuring subsequently reflected light from the foodstuff and providing a second signal, said peaking circuit including an amplifier directly responsive to the maximum reflected light for initiating the development of the first signal and further for determining the difference between the first and the second signals, and providing a third signal; and a comparator means for comparing the third signal and a preset signal, the preset signal being proportionate to a desired heating level, the comparator means providing a terminating signal to deactivate heating when the preset and the third signals are substantially equal.

The heating level of the control arrangement described above may correspond to a desired browning level.

The control arrangement described above may further include:

a timed circuit for warming or lightly toasting the foodstuff, independent of the peaking circuit, comprising a first timed signal operative to deenergize the heating elements after a preset time.

The control arrangement described above may further include:

a failsafe circuit adapted to deactivate the toasting elements after a prescribed time, the failsafe circuit providing a timed signal operative to deenergize the heating elements after the prescribed time.

The control arrangement described above may further include:

a failsafe circuit adapted to deactivate the toasting elements after a prescribed time, the failsafe circuit providing a second timed signal operative to deenergize the heating elements after the prescribed time.

The control arrangement described above may further comprise an initial delay circuit for avoiding power-on glitches.

The present invention may provide a control arrangement described above wherein during warming or lightly toasting foodstuff, said preset signal is provided by a fixed voltage divider.

The invention may provide a control arrangement described above wherein said preset signal is provided by a source of first voltage, said preset signal being a fraction of said first voltage and being determined in conjunction with a first voltage divider.

The invention may provide a control arrangement described above wherein said preset signal is further provided by a source of second voltage, the second voltage being of larger magnitude than the first voltage and being coupled via the first voltage divider, the preset signal being of a magnitude substantially between said first and said second voltages.

The invention may provide a control arrangement described above wherein the preset signal is subtracted from the third signal.

The control arrangement described above may further comprise a first voltage source coupled to a second voltage divider, the divider providing a divided signal to be compared with said preset signal and providing a warm signal when said divided and said preset signals are substantially equal, the warm signal serving to deactivate heating when the foodstuff is slightly browned.

The invention may provide a control arrangement described above wherein the preset signal is provided by a first voltage divider coupled to said first voltage source.

The invention may provide a control arrangement described above wherein the first voltage divider is also coupled to a source of second voltage, the second voltage being larger in magnitude than said first voltage.

The control arrangement described above may further comprise a source of first voltage coupled to said peaking circuit, and wherein said first signal is provided in response to the differential between said first voltage and a heating level voltage representative of the heating of said foodstuff.

The invention may provide a control arrangement described above wherein the first signal is stored in a voltage storage means, and wherein a unidirectional current element is coupled to the storage means to substantially prevent discharge of said first signal.

The invention may provide a control arrangement described above wherein the peaking circuit includes a first amplifier coupled to provide a heating signal indicative of the level of foodstuff heating, and a second amplifier coupled to the first amplifier and forming a feedback loop therewith, the second amplifier adapted to provide said first signal in proportion to the difference between said heating signal and a reference signal.

The invention may provide a control arrangement described above wherein the peaking circuit includes a light receiving element adapted to determine the magnitude of said first signal.

The invention may provide a control arrangement described above wherein a light receiving element is coupled to vary the gain of said first amplifier in response to the measure of reflected light.

The present invention may also provide a control arrangement for a food heating device having heating elements for browning foodstuff and said heating elements providing a source of light impinging on the foodstuff, the control arrangement comprising:

means for determining maximum reflected light from the foodstuff and providing a first signal in response thereto;

means for measuring subsequently reflected light from the foodstuff and for providing a second signal in response thereto;

said means for determining maximum reflected light also being adapted to determine the difference between the first and the second signals and provide a third signal representative of the difference;

means for establishing a preset signal which is proportionate to a desired level of browning of the foodstuff; and comparator means for comparing the third signal and the preset signal, the comparator means providing a terminating signal to deactivate browning when the preset and the third signals are substantially equal.

The invention may provide an electric food heating device including a control arrangement described above.

The present invention may provide a toaster having toasting elements for browning foodstuff and providing a source of light impinging on the foodstuff, the toaster including a control arrangement having an independent timed circuit for warming or lightly toasting the foodstuff prior to normal toasting, said timed circuit being adapted to provided a timed signal operative to deenergize the toasting elements after a preset time.

The present invention may provide a toaster having toasting elements for browning foodstuff and providing a source of light impinging on the foodstuff, the toaster including a control arrangement having a failsafe circuit adapted to deactivate the toasting elements after a prescribed time, the failsafe circuit providing a timed signal operative to deenergize the toasting elements after the prescribed time.

The present invention may provide in a toaster a peak detector comprising:

a light detector for providing a first output proportionate to light received by said detector, a first amplifier coupled to said detector, the first amplifier having a gain proportionate to said first output, the first amplifier also coupled to a first reference, and having a second output, a second amplifier coupled to said first amplifier so as to form a closed or feedback loop, the second output being provided to said second amplifier together with a second reference and providing a third output, the third output being provided to a storage means and to said first amplifier, the storage means providing an indication of the measure of a peak level detected.

The peak detector described above may further comprise:

a diode means interposed said third output and said storage means, the diode substantially preventing leakage of said third output.

The invention may provide a peak detector described above wherein the third output is proportional to the difference between the second output and said second reference.

The invention may provide a peak detector described above wherein said third output is feedback to said first amplifier to provide a measure of change of said first output.

The present invention may provide a toaster including the aforementioned peak detector.

The toaster described above may further include a variable voltage divider coupled to said second reference for providing a desired foodstuff heating level signal.

The toaster described above may further include a comparator adapted to provide a done signal when said second output substantially equals said desired level signal, the done signal effecting deactivation of foodstuff heating.

DETAILED DESCRIPTION OF PREFERRED EMBODIMENTS

Preferred embodiments of the present invention will now be described, by way of example only, with reference to the accompanying drawings, wherein:

FIG. 5 shows a comparison of light reflectivity (shown as an inverse of resistivity) for various types of foodstuffs;

FIG. 6 shows a power supply suitable for FIGS. 2 and 3; and

FIG. 7 shows a microprocessor form of the present invention.

Figure 1:
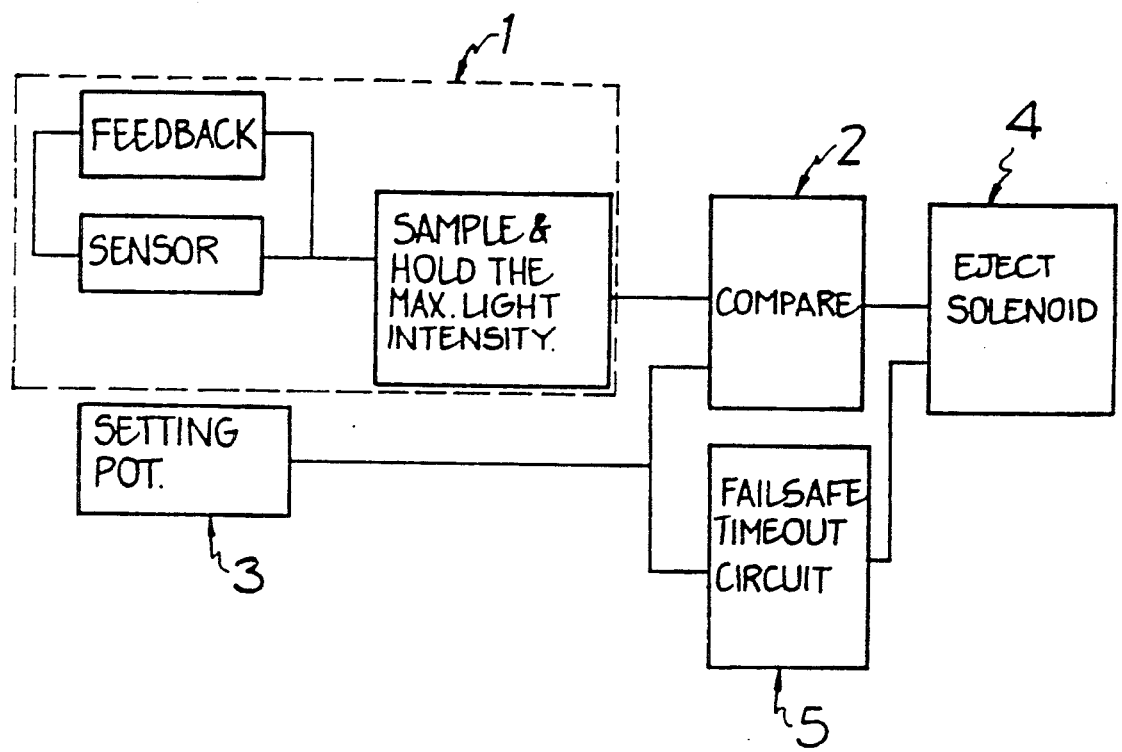
FIG. 1 shows a toaster of the present invention in block diagram form.
Figure 2:
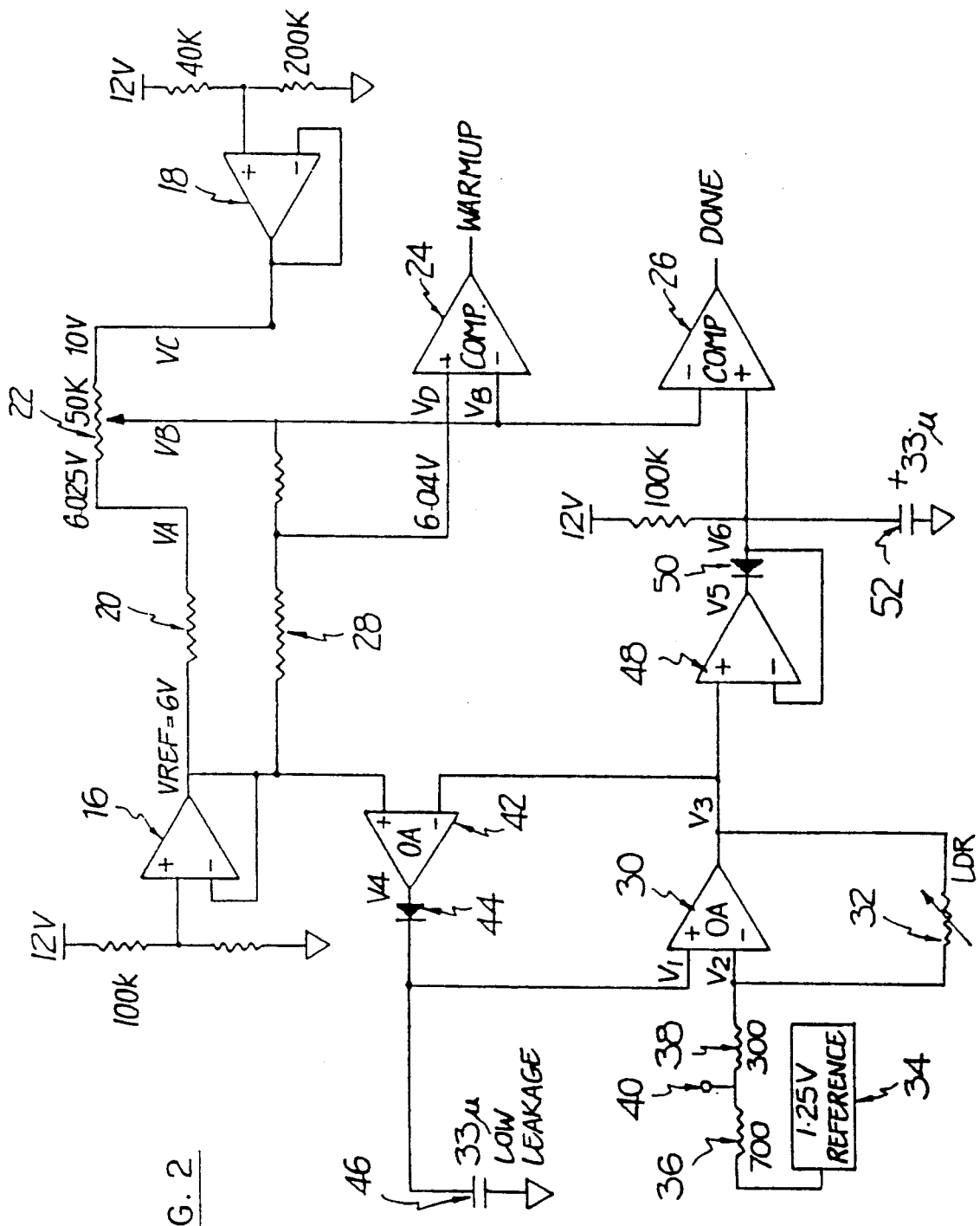
FIGS. 2 and 3 show one form of circuit diagram of a toaster according to the present invention.
Figure 3:
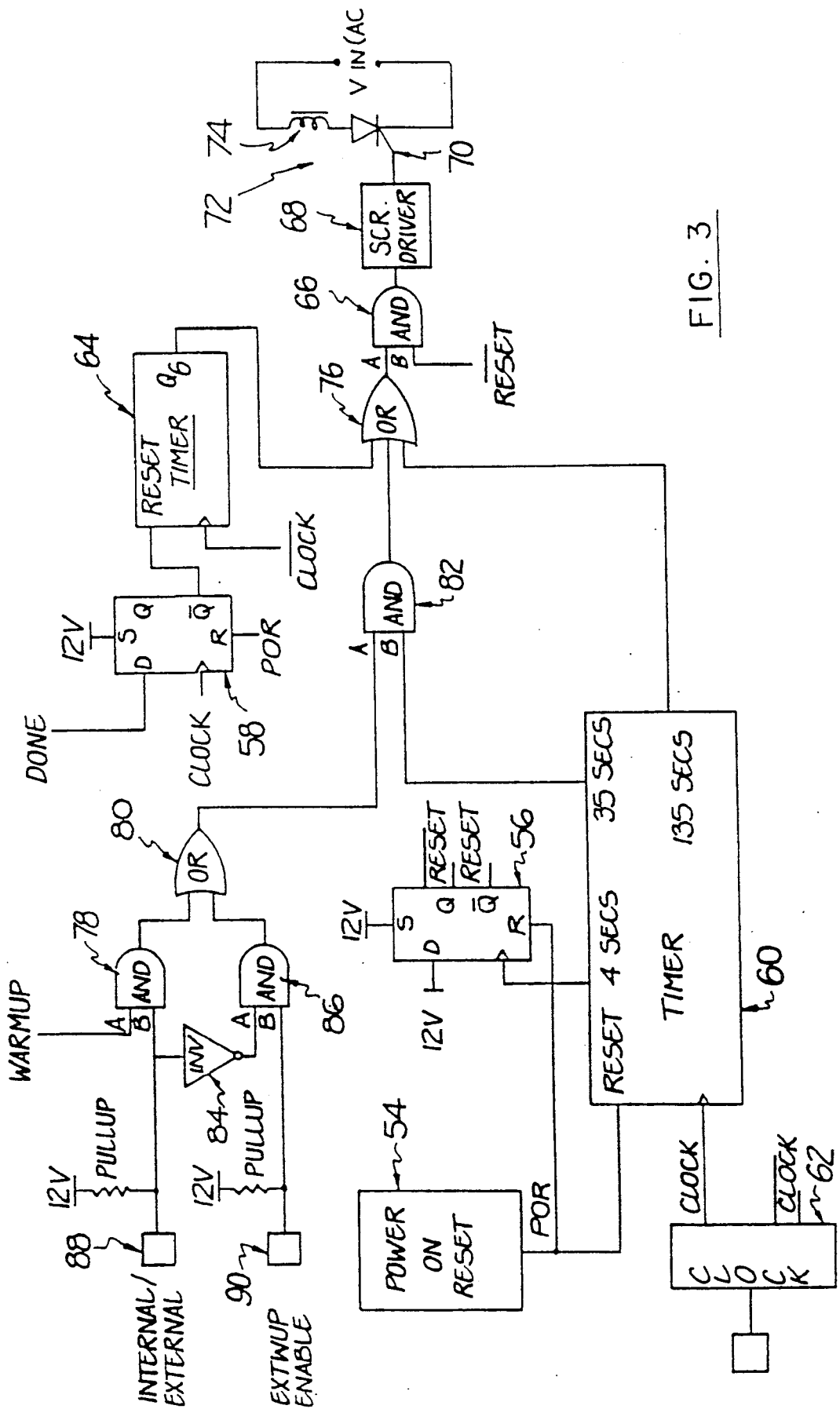

The circuit shown in FIGS. 1, 2 and 3 comprises a light sensor circuit (1) provided with feedback means to sample and hold a measure of the maximum value of light reflected from a food product to be toasted, a comparator (2) for comparing light reflected from that food product after detecting said maximum value and a predetermined degree of browness, which, when that comparison equals the predetermined degree of browness represented by a fraction of said measure determined by a setting potentiometer (3), causes a signal to pass to an eject solenoid (4) to deactivate the toaster element and/or to eject the food product from the toaster. A failsafe timeout circuit (5) is also provided to avoid hazardous operation in the event that the toaster is accidentally activated, by deactivating the toaster after a predetermined period of time.

The voltages and values herein described are exemplary only, and can be varied without affecting the operation of the present invention, as would be known by those skilled in the art.

As illustrated in FIG. 6, a power circuit 10 includes a regulator 12 and a capacitor 14 which are connected across an AC source (not shown) to provide a D.C. voltage output of 12 volts. The D.C. voltage is used to power components of the toaster.

Referring to FIG. 2, a reference voltage ($V_{ref}$) of 6 volts appears at the output of an amplifier 16 while a voltage of 10 volts appears at the output of a second amplifier 18. $V_{ref}$ sets the levels throughout the toaster circuit. A voltage divider which includes a resistor 20 and a potentiometer 22 is connected between the outputs of the amplifiers 16 and 18 with a 25 millivolts drop appearing across resistor 20. This provides a voltage range between 6.025 volts ($V_A$) and 10 volts ($V_c$) for potentiometer 22. A voltage $V_B$ appears at the center arm of potentiometer 22 which is connected to the negative input of each of a "warmup" comparator 24 and a "done" comparator 26. The positive input of "warmup" comparator 24 is connected to one side of a resistor 28 the other side of which is connected to $V_{ref}$. There is a voltage drop of 40 millivolts across resistor 28 whereby a potential of 6.04 volts ($V_D$) appears at the positive input of comparator 24.

A light-reflective monitoring circuit having an integral peak detection capability includes a first op-amp 30. Op amp 30 includes a feedback loop with a light dependent resistor (LDR) 32 coupled between the output and the negative input of the amplifier. A reference source 34 of 1.25 volts is coupled through resistors 36 and 38 to the negative input of op-amp 30. Resistors 36 and 38 are valued at 700 ohms and 300 ohms respectively to provide a total of 1K ohms. A center tap 40 is provided in the event less input resistance is desired. Reference source 34 provides an offset voltage for the negative input of op-amp 30 to start the circuit properly without introducing noise from the positive supply into the loop.

The light-reflective monitoring circuit also includes a second op-amp 42 having $V_{ref}$ coupled to its positive input and the output of op amp 30 coupled to its negative input. The output of op-amp 42 is coupled through a diode 44 to a capacitor 46 and also to the positive input of op-amp 30.

A third op-amp 48 couples the output of op-amp 30 to the positive input of comparator 26 through a diode 50 and is clamped by a capacitor 52. Op-amp 48 is used to eliminate the small amount of 50/60 Hz. ripple picked up by the LDR 32. This ripple can be as high as 200 millivolts peak to peak depending on ambient lighting conditions, (FIG. 4c).

The following table lists the designations for various voltages in the circuit illustrated in FIG. 2:

$V_{ref}$—output of amplifier 16
$V_A$—low side of potentiometer 22
$V_B$—center arm of potentiometer 22
$V_C$—high side of potentiometer 22
$V_D$—positive input of comparator 24
$V_1$—positive input of op amp 30
$V_2$—negative input of op amp 30
$V_3$—output of op amp 30
$V_4$—output of op amp 42
$V_5$—output of op amp 48
$V_6$—positive input of comparator When the toaster is to be used, the user manually adjusts the center arm of potentiometer 22 to a position representative of the desired level of browning of the bread. The bread is then placed on the toaster elevator which is then lowered whereby the toaster is initially operated. Referring to FIG. 3, reset signal POR is then developed by a reset circuit 54 and is coupled to and resets a pair of flip-flops 56 and 58 as well as a timer 60. Also, a clock 62 develops either 50 Hz or 60 Hz square wave CLOCK and $\overline{CLOCK}$ outputs. The CLOCK output is coupled to timer 60 and flip-flop 58 while the $\overline{CLOCK}$ output is coupled to a timer 64. The $\overline{RESET}$ output of flip-flop 56, which is initially low, is connected to the "B" input of an AND gate 66 whereby the output of the gate is held low.

The output of AND gate 66 is coupled to a SCR driver 68 which applies a bias to a gate 70 of a SCR 72. SCR 72 controls the actuation of a coil 74 of a solenoid which initiates the raising of the bread-supporting elevator of the toaster and also facilitates the shut down of the electronics of the toaster at the appropriate time.

Based on a 60 Hz. output from clock 62, timer 60 develops output signals at 4 seconds, 35 second and 135 seconds after the toaster has been initially operated. The 4-seconds signal is fed to flip-flop 56 whereby the RESET output of the flip-flop goes high and prepares AND gate 66 so that, upon application of a high signal to the "A" input of the AND gate, the output of the gate will go high. This provides a four second delay after toaster start-up to allow for transient start-up interference to settle down before effective monitoring begins.

Referring again to FIG. 2, as the circuit comes up to operational level, $V_3$ attains the level of $V_{ref}$, i.e. 6 volts. Light is directed from the heating elements of the toaster onto the surface of the bread to be toasted and is reflected onto a light sensitive device such as LDR 32. During the early phase of the process, the reflected light is increasing in intensity as the heating elements approach full illumination intensity thereby causing the resistance value of LDR 32 to decrease, (FIG. 5). In addition, the bread may be moist and will need to pass through a "cooking" phase to dry the bread to a condition sufficient to be receptive to a "browning" phase. In this instance, the reflected light also may be increasing due to the changing nature of the bread from moist to dry. In any event, the reflected light is increasing in intensity during the early phase.

As the resistance of LDR 32 decreases, the differential in voltage level between $V_1$ and $V_2$ changes slightly resulting in a slight decrease in $V_3$ at the output of op-amp 30. The decrease in $V_3$ is coupled to the negative input of op-amp 42 resulting in the development of $V_4$ at the output of the op-amp. $V_4$ is then coupled through diode 44 to charge capacitor 46. The level of charge of capacitor 46 is then representative of the most recent maximum intensity level of the reflected light. Thus, as long as the intensity of the reflected light continues to increase, capacitor 46 will continue to charge in the context of a peak holding circuit.

During this period of increase of the intensity of the reflected light, the charge level of capacitor 46, i.e., $V_1$, appears at the positive input of op-amp 30. Since the charging of capacitor 46 is directly proportional to the decrease in $V_2$, and as illustrated in voltage-time graphs (a) and (b) of FIG. 4, $V_1$ and $V_2$ tend to track along the same voltage curve. Thus, with $V_1$ and $V_2$ maintaining a generally constant differential as time increases, $V_3$ appears to remain generally constant at the level of $V_{ref}$. However, it is recognized that slight variations in $V_2$ and $V_3$ are occurring as the resistance of LDR 32 decreases in response to increasing intensity of the reflected light to thereby effectively charge capacitor 46.

Figure 4:
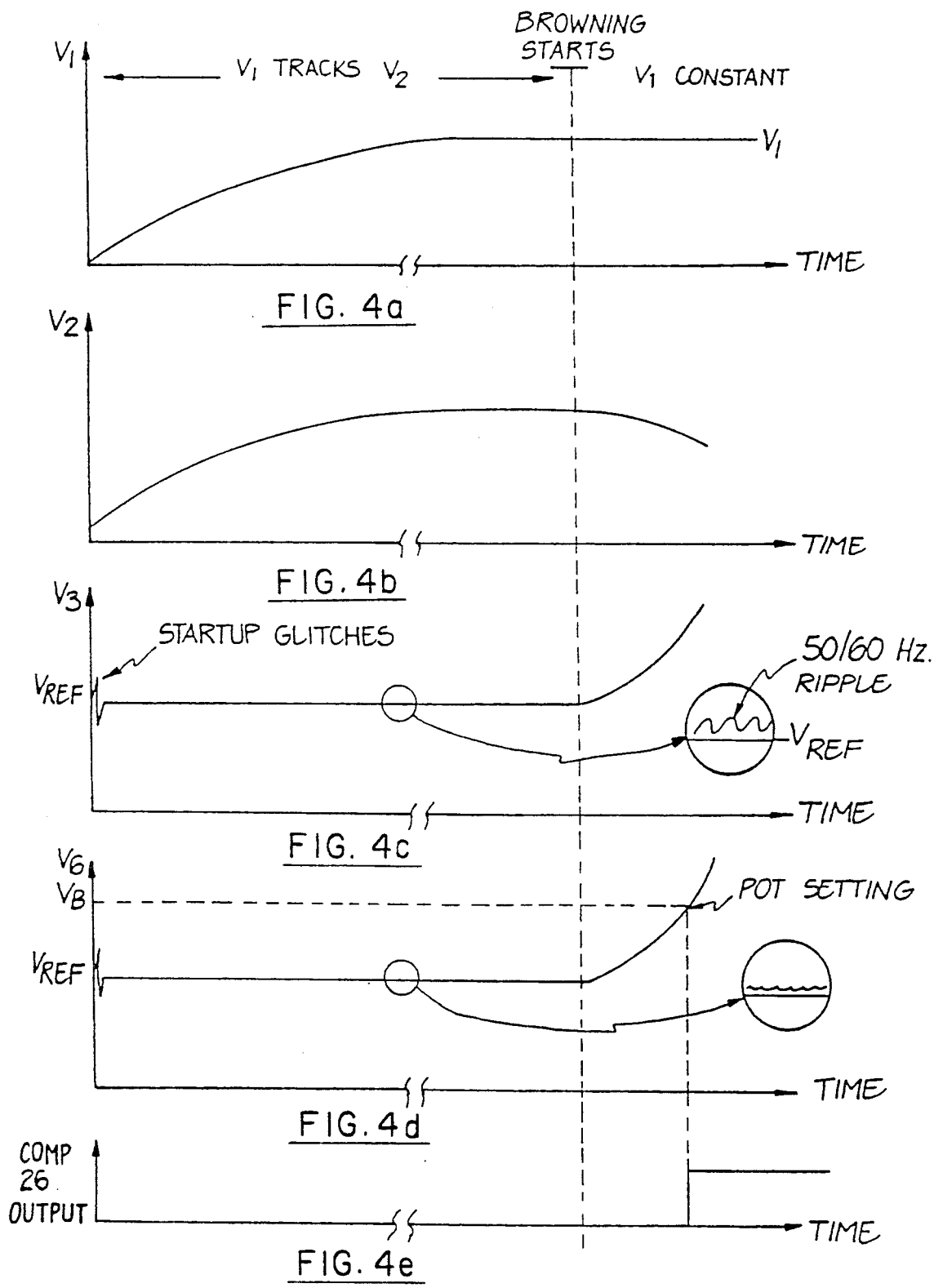
FIGS. 4a–4c show, graphically, voltages at various points in the circuit diagram of FIG. 3.

Eventually, the bread begins to brown as represented by the "browning starts" line which extends vertically through graphs (a)-(e) of FIG. 4, and Rm in FIG. 5. As the bread begins to brown, the intensity of the reflected light begins to decrease and the resistance value of LDR 32 begins to increase whereby $V_2$ begins to decrease as illustrated in graph (b) of FIG. 4. As $V_2$ decreases, $V_3$ increases as shown in graph (c) of FIG. 4 and the output $V_4$ of op-amp 42 decreases. Normally, capacitor 46 would start to discharge through op-amp 42. However, diode 44 prevents capacitor 46 from discharging whereby the capacitor "holds" the charge representing the maximum light-reflected intensity detected by LDR 32.

Since the charge of capacitor 46 serves as the source of $V_1$, $V_1$ is thereafter at a constant level as illustrated in graph (a) of FIG. 4.

Thus, $V_1$ (.i.e., the charge on capacitor 46) becomes a standard or reference representing maximum reflected light intensity of the bread (Rm in FIG. 5) and a value against which subsequent instantaneous "browning" reflected light values ($\Delta R$ in FIG. 5) can be compared.

As the browning of the bread continues, the reflected light intensity decreases whereby $V_2$ continues to decrease (graph (b) of FIG. 4) and $V_3$ continues to increase (graph (c) of FIG. 4). As shown on graph (c) of FIG. 4, a 50 Hz or 60 Hz ripple of up to 200 millivolts develops on $V_3$ as a result of ambient lighting conditions. $V_3$, with the ripple riding thereon, is fed to the positive input of op amp 48 where the output of the op amp appears as $V_5$ which is coupled through diode 50 to develop $V_6$ as illustrated in graph (d) of FIG. 4. The ripple is effectively removed or reduced then by op-amp 48 and diode 50 also as illustrated in graph (d) of FIG. 4.

$V_6$ increases as $V_3$ increases and is coupled to the positive input of the "done" comparator 26. As $V_6$ increases to a level equal to $V_B$, which is the voltage setting of potentiometer 22, the bread has attained the desired browness as established by the user in setting the potentiometer and the output of comparator 26 goes high as illustrated in graph (e) of FIG. 4 to develop a "done" signal.

The "done" signal is coupled to flip-flop 58 as illustrated in FIG. 3 whereby the $\overline{Q}$ output thereof resets timer 64 which begins to count at the pace of the CLOCK signal. After a lapse of about a half-second to block noise pulses which may be occurring during the transition of this shut-down period, the Q6 output of timer 64 goes high which is coupled through an OR gate 76 to the "A" input of AND gate 66. Since "B" input of AND gate 66 is high through the RESET signal as noted previously, the output of the AND gate will now go high resulting in the firing of SCR 72. When SCR 72 fires, the solenoid is actuated whereby the heater elements are turned off and the bread elevator rises to position the browned bread for removal from the toaster.

Thus, the electronics of the toaster provides facility for establishing an initial reference to standard (i.e., maximum light reflection of the bread to be toasted) against which successively increasing degrees of browness (i.e. instantaneous light reflection of the surface of the bread as it is being browned) will be measured to obtain a browning signal which is compared with a user-set voltage level representative of the desired level of browness. A match between the browning signal and the user-set voltage level results in a shut down of the heater elements and ejection of the browned bread. Also, by establishing the reference or standard based on maximum light reflectivity of the particular bread to be browned, different types of bread (white, rye, wheat, etc.) can be effectively toasted to the same degree of browness.

Referring again to FIG. 2, if only warming of the bread or a very slight level of browness is desired, the user will set the center arm of potentiometer 22 so that $V_B$ is only slightly lower than $V_A$, e.g. at 6.03 volts. At such a low setting, it is feasible that slight change in browness will be insufficient to develop the sensitivity in the light reflection system including LDR 32 to the extent that comparator 26 may not develop a "done" signal.

Therefore, to enable the desired slight browness effect for low settings of potentiometer 22, the center arm of the potentiometer is coupled to the negative input of comparator 24 and compared with the input to the positive input thereof. Since the positive input of comparator 24 is always at the level of 6.04 volts, for any input of the negative input thereof which is below 6.04 volts, the output of the comparator will be high and represents a "warmup" signal.

Referring to FIG. 3, when the toaster is initially operated, the "B" input of an AND gate 78 goes high. When the "warmup" signal is developed at the output of comparator 24 (FIG. 2), the "A" input of AND gate 78 goes high whereby the output of the gate goes high. This high is coupled through an OR gate 80 and is applied to the "A" input of an AND gate 82. After 35 seconds from start up of the operation of the toaster has lapsed, the 35-second signal is developed by timer 60 and is coupled as a high to the "B" input of AND gate 82 whereby the output of the gate goes high. This high is coupled through OR gate 76 whereby the solenoid is eventually actuated in the matter previously described to terminate the operation of the toaster and eject the bread.

In this manner, when the center arm of potentiometer 22 is set at the low end of the voltage range (i.e., below 6.04 volts), the toaster will operate for 35 seconds thereby providing a warming of the bread and, possibly, with a slight browning thereof.

When input "B" of AND gate 78 goes high, input "A" of an AND gate 86 goes low by virtue of inverter 84 to disable the gate 86 during the period of normal "warmup" operation as controlled internally of the toaster through the output of comparator 24. Thus, the output of AND gate 86 will be low even though input "B" of the gate goes high when the toaster is initially operated.

A warmup cycle can be initiated externally of the toaster by connecting a low to terminal 88 and a high to terminal 90. In this manner, the low on terminal 88 is applied to input "B" of AND gate 78 to disable the gate while each of the inputs "A" and "B" of AND gate 86 go high whereby the output of AND gate 86 goes high. This high is coupled through OR gate 80 and the procedure continues as described above to terminate operation of the toaster after a lapse of 35 seconds.

As previously noted, timer 60 also develops a high output after a lapse of 135 seconds from initial operation of the toaster, provided that operation of the toaster has not been previously terminated. This high is coupled through OR gate 76 whereby the solenoid is operated as described above to terminate operation of the toaster. This feature provides a failsafe facility which insures that the operation of the toaster will be terminated within a safe time period regardless of the failure of the browning and warming facilities of the toaster. Also, the failsafe facility will operate in the event the toaster had been operated without the insertion of bread.

A further embodiment in the form of a microprocessor circuit is shown in FIG. 7 and which functions similarly to the analogue circuit above described but, additionally, has a keypad for entering toasting values for different foods, and for storing and cancelling those values. Further, an A/D convertor is used together with an EEPROM to store a programme for such operation. A microprogram suitable for such a further embodiment is listed as follows:

: toaster control program

:

-continued

| | | equates | | |
|---|---|---|---|---|
| 000C | INSEMS | " OC | ; | COMMAND FOR 834 CHAN 0 |
| 000E | INPUT | = OE | ; | COMMAND FOR 834 CHAN 1 |
| 0000 | SELAD | = 00 | ; | SELECT A TO D CONVERTER |
| 0001 | DESELA | = 01 | ; | DESELECT A TO D CONVERTER |
| 0005 | SOLON | = 05 | ; | COMMAND TO TURN SOLENOID ON AND TOASTER OFF |
| 0006 | TIMES1 | = 06 | ; | COUNT FOR RESISTANCE INCREASING |
| | | | ; | COUNT ACTUALLY =16-TIMES1 |
| | TIMES2 | = 0A | ; | COUNT FOR TOAST DONE |
| | | | ; | COUNT ACTUALLY =16-TIMES2 |
| 000C | PAGE | = 0C | ; | PAGE ADDRESS OF TABLE FOR LOID INSTRUCTION |
| | | | ; | TABLE LOCATED AT START OF PAGE 7 |
| 000F | SUB0 | = 0F | ; | MUST SUBTRACT 1 (ADD FF) TO AD VALUE DURING GT TEST |
| 000F | SUB1 | = 0F | ; | TO OFFSET ERRORS INTRODUCED BY JITTER IN LSB OF A TO D |
| 0005 | BURNT | = 05 | ; | BURNT TOAST SENSE FOR TESTING A TO D INPUT |
| | | | ; | IF A TO D = "B0" THEN TOAST MUST BE BURNT |
| 000 | DT0 | = 00 | ; | LO NIBBLE FOR DELAY ROUTINE COUNTER |
| 0008 | DT1 | = 08 | ; | MID NIBB. ONES COMPLEMENT USED |
| 000F | DT2 | = 0F | ; | HI NIBBLE =100 MILLISECONDS |
| | | | ; | ACTUALLY EB0 = 100 MSEC BUT |
| | | | ; | THIS TOO SLOW TO POLL KEYPAD |
| | | | ; | INPUT |
| 0000 | ODF0 | = 00 | ; | LO NIBBLE FOR SOLENOID DELAY ROUTINE |
| 0000 | DTF1 | = 00 | ; | MID NIBBLE ONES COMPLEMENT |
| 0101 | DTF2 | = 01 | ; | HI NIBBLE S0L. ON FOR APPROX LONG TIME |
| 0000 | DT10 | = 00 | ; | LO NIBBLE FOR INITIAL DELAY |
| 0000 | DT11 | = 00 | ; | MID NIBBLE 2'S COMPLEMENT |
| 0001 | DT12 | = 01 | ; | HI NIBBLE MAKE IT A LONG DELAY |
| | | RAM USEAGE | | |
| 000E | AD0 | = 0,0E | ; | A TO D LOW NIBBLE FOR SENSOR |
| 000F | AD1 | = 0,0F | ; | A TO D HI NIBBLE FOR SENSOR |
| 000C | POT0 | = 0,0C | ; | A TO D LO NIBBLE FOR POT SETTING |
| 000D | POT1 | = 0,0D | ; | A TO DE HI NIBBLE FOR POT SETTING |
| 0009 | CMT | = 0,09 | ; | COUNTER FOR AVERAGING |
| 0019 | STAT | = 1,09 | ; | STATUS INFO FOR ARITHMETIC TESTS |
| | | | ; | BIT 0 =1 NOT EQUAL |

The claim defining the invention are as follows.
I claim:

1. A control arrangement for an electric food heating device having heating elements for heating foodstuff and said heating elements providing a source of light impinging on the foodstuff, the control arrangement comprising:

a peaking circuit to determine maximum reflected light from the foodstuff and provide a first signal, and measuring subsequently reflected light from the foodstuff and providing a second signal, said peaking circuit including an amplifier directly responsive to the maximum reflected light for initiating the development of the first signal and further for determining the difference between the first and the second signals, and providing a third signal; and a comparator means for comparing the third signal and a preset signal, the preset signal developed independently of the third signal and being proportionate to a desired heating heating level, the comparator means providing a terminating signal to deactivate heating when the present and the third signals are substantially equal.

2. A control arrangement as claimed in claim 1, wherein the heating level corresponds to a desired browning level.

3. A control arrangement as claimed in claim 1, further including:

a timed circuit for warming or lightly toasting the foodstuff, independent of the peaking circuit, comprising a first timed signal operative to deenergize the heating elements after a preset time.

4. A control arrangement as claimed in claim 1, further including:
a failsafe circuit adapted to deactivate the heating elements after a prescribed time, the failsafe circuit providing a second timed signal operative to deenergize the heating elements after the prescribed time.

5. A control arrangement as claimed in claim 3, further including:
a failsafe circuit adapted to deactivate the heating elements after a prescribed time, the failsafe circuit providing a second timed signal operative to deenergize the heating elements after the prescribed time.

6. A control arrangement as claimed in claim 1, further comprising an initial delay circuit for avoiding power-on glitches.

7. A control arrangement as claimed in claim 3, wherein during warming or lightly toasting foodstuff, said preset signal is provided by a fixed voltage divider.

8. A control arrangement as claimed in claim 1, wherein said preset signal is provided by a source of first voltage, said preset signal being a fraction of said first voltage and being determined in conjunction with a first voltage divider.

9. A control arrangement as claimed in claim 8, wherein said preset signal is further provided by a source of second voltage, the second voltage being of larger magnitude than the first voltage and being coupled via the first voltage divider, the present signal being of a magnitude substantially between said first and said second voltages.

10. A control arrangement as claimed in claim 1, 8 or 9, wherein the present signal is subtracted from the third signal.

11. A control arrangement as claimed in claim 1, further comprising a first voltage source coupled to a second voltage divider, the divider providing a divided signal to be compared with said preset signal and providing a warm signal when said divided and said preset signals are substantially equal, the warm signal serving to deactivate heating when the foodstuff is slightly browned.

12. A control arrangement as claimed in claim 11, wherein the preset signal is provided by a first voltage divider coupled to said first voltage source.

13. A control arrangement as claimed in claim 12, wherein the first voltage divider is also coupled to a source of second voltage, the second voltage being larger in magnitude than said first voltage.

14. A control arrangement as claimed in claim 1, further comprising a source of first voltage coupled to said peaking circuit, and wherein said first signal is provided in response to the differential between said first voltage and a heating level voltage representative of the heating of said foodstuff.

15. A control arrangement as claimed in claim 1 or 14, wherein the first signal is stored in a voltage storage means, and wherein a unidirectional current element is coupled to the storage means to substantially prevent discharge of said first signal.

16. A control arrangement as claimed in claim 1, wherein the peaking circuit includes a first amplifier coupled to provide a heating signal indicative of the level of foodstuff heating, and a second amplifier coupled to the first amplifier and forming a feedback loop therewith, the second amplifier adapted to provide said first signal in proportion to the difference between said heating signal and a reference signal.

17. A control arrangement as claimed in claim 1, wherein the peaking circuit includes a light receiving element adapted to determine the magnitude of said first signal.

18. A control arrangement as claimed in claim 16, wherein a light receiving element is coupled to vary the gain of said first amplifier in response to the measure of reflected light.

19. An electric food heating device including a control arrangement according to claim 15.

20. A control arrangement for a food heating device having heating elements for browning foodstuff and said heating elements providing a source of light impinging on the foodstuff, the control arrangement comprising:
means for determining maximum reflected light from the foodstuff and providing a first signal in response thereto;
means for measuring subsequently reflected light from the foodstuff and for providing a second signal in response thereto;
said means for determining maximum reflected light also being adapted to determine the difference between the first and the second signals and provide a third signal representative of the difference;
means for establishing a preset signal independently of the third signal which is proportionate to a desired level of browning of the foodstuff; and
comparator means for comparing the third signal and the preset signal, the comparator means providing a terminating signal to deactivate browning when the preset and the third signals are substantially equal.

21. An electric food heating device including a control arrangement according to any one of claims 1-9, 11 to 14 and 16 to 20.

22. In a toaster, a peak detector comprising:
a light detector for providing a first output proportionate to light received by said detector,
a first amplifier coupled to said detector, the first amplifier having a gain proportionate to said first output, the first amplifier also coupled to a first reference, and having a second output,
a second amplifier coupled to said first amplifier so as to form a closed or feedback loop,
the second output being provided to said second amplifier together with a second reference and providing a third output,
the third output being provided to a storage means and to said first amplifier,
the storage means providing an indication of the measure of a peak level detected.

23. A peak detector as claimed in claim 22, further comprising:
a diode means interposed said third output and said storage means, the diode substantially preventing leakage of said third output.

24. A peak detector as claimed in claim 22 or 23, wherein the third output is proportional to the difference between the second output and said second reference.

25. A peak detector as claimed in claim 22, wherein said third output is feedback to said first amplifier to provide a measure of change of said first output.

26. A toaster including a peak detector as claimed in any one of claims 22, 23 or 25.

27. A toaster as claimed in claims 26, further including a variable voltage divider coupled to said second reference for providing a desired foodstuff heating level signal.

28. A toaster as claimed in claim 27, further including a comparator adapted to provide a done signal when said second output substantially equals said desired level signal, the done signal effecting deactivation of foodstuff heating.

29. A toaster as claimed in claim 26, further including a control arrangement having an independent timer circuit for warming or lightly toasting the foodstuff prior to normal toasting, said timer circuit being adapted to provide a timed signal operative to de-energize toasting elements of the toaster after a preset time.

30. A toaster as claimed in claim 26, further including a control arrangement having a failsafe circuit adapted to deactivate toasting elements of the toaster after a prescribed time, the failsafe circuit providing a timed signal operative to de-energize the toasting elements after the prescribed time.

31. A toaster as claimed in claim 27, further including a control arrangement having an independent timer circuit for warming or lightly toasting the foodstuff prior to normal toasting, said timer circuit being adapted to provide a timed signal operative to de-energize toasting elements of the toaster after a preset time.

32. A toaster as claimed in claim 28, further including a control arrangement having an independent timer circuit for warming or lightly toasting the foodstuff prior to normal toasting, said timer circuit being adapted to provide a timed signal operative to de-energize toasting elements of the toaster after a preset time.

33. A toaster as claimed in claim 27, further including a control arrangement having a fail-safe circuit adapted to deactivate toasting elements of the toaster after a prescribed time, the fail-safe circuit providing a timed signal operative to de-energize the toasting elements after the prescribed time.

34. A toaster as claimed in claim 28, further including a control arrangement having a fail-safe circuit adapted to deactivate toasting elements of the toaster after a prescribed time, the fail-safe circuit providing a timed signal operative to de-energize the toasting elements after the prescribed time.

* * * * *